Figure 1:
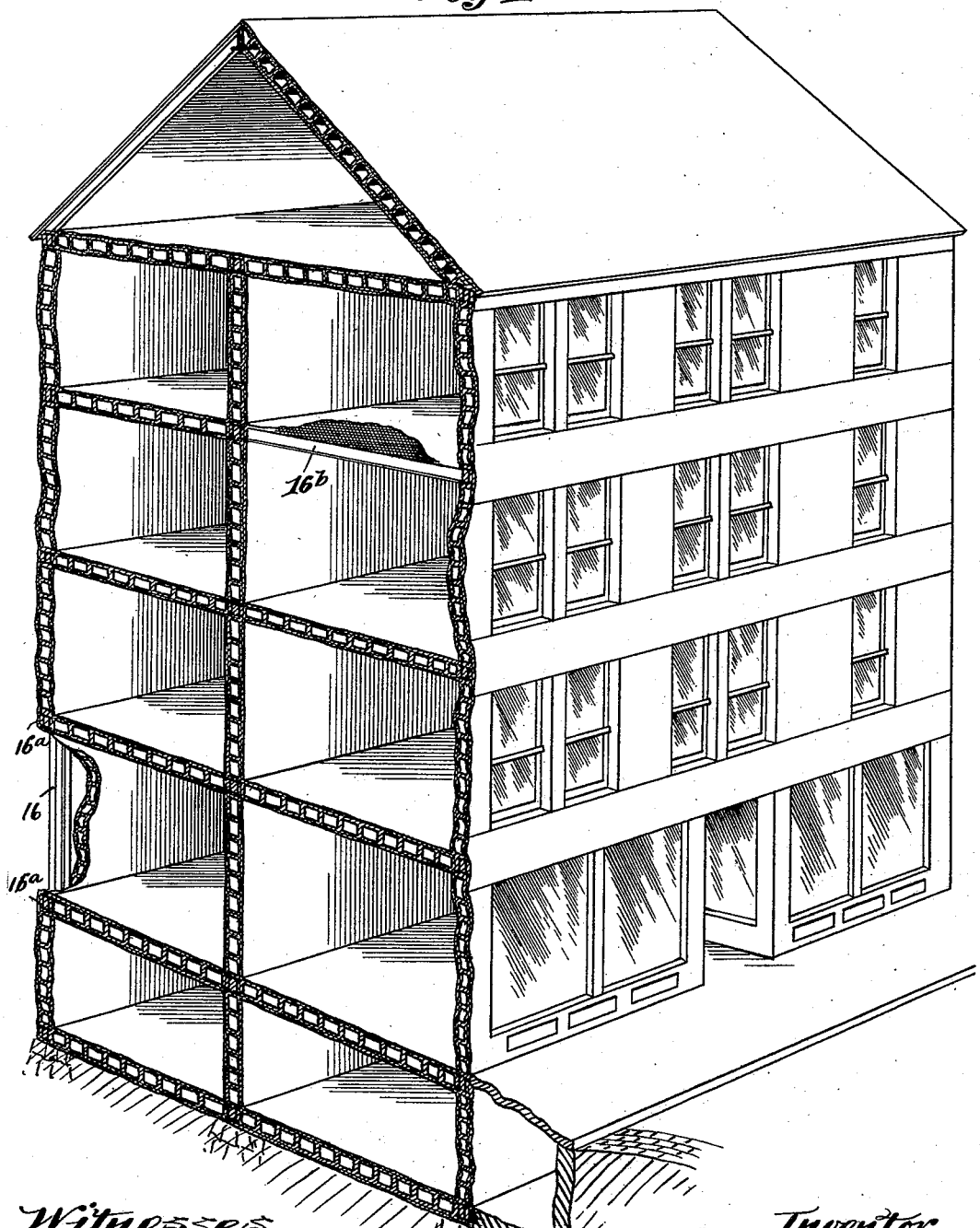

(No Model.) 6 Sheets—Sheet 1.

T. JONES.
BUILDING CONSTRUCTION.

No. 563,278. Patented July 7, 1896.

Witnesses: Inventor:
Thomas Jones

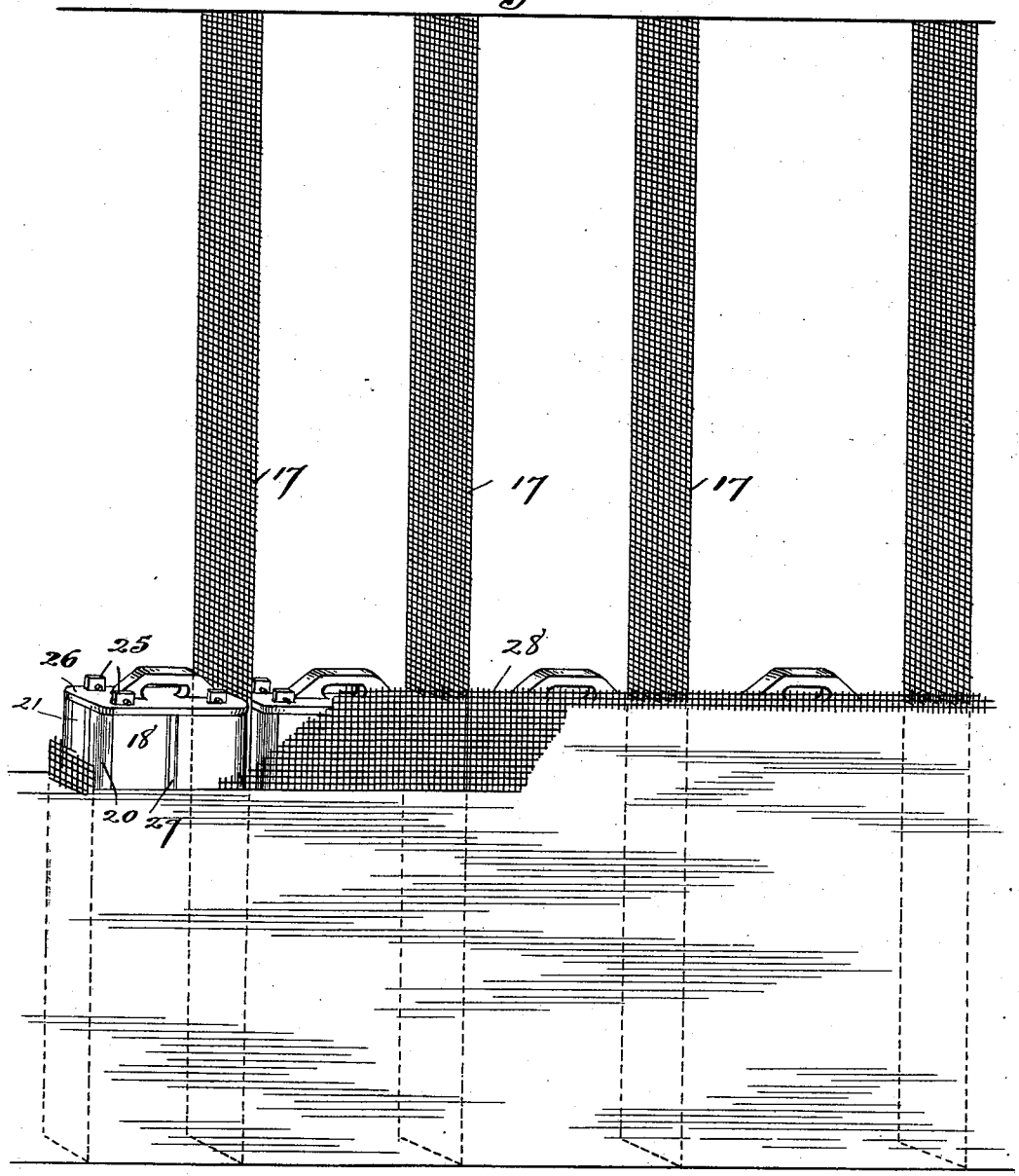

(No Model.) 6 Sheets—Sheet 3.
T. JONES.
BUILDING CONSTRUCTION.
No. 563,278. Patented July 7, 1896.
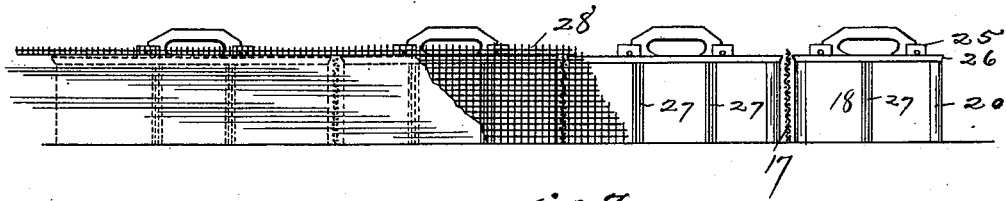
Fig. 2.
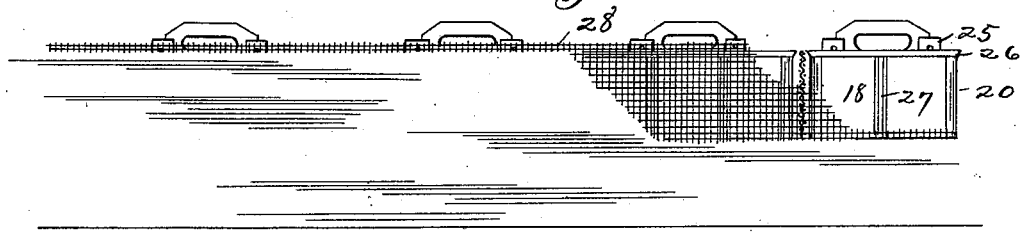
Fig. 3.
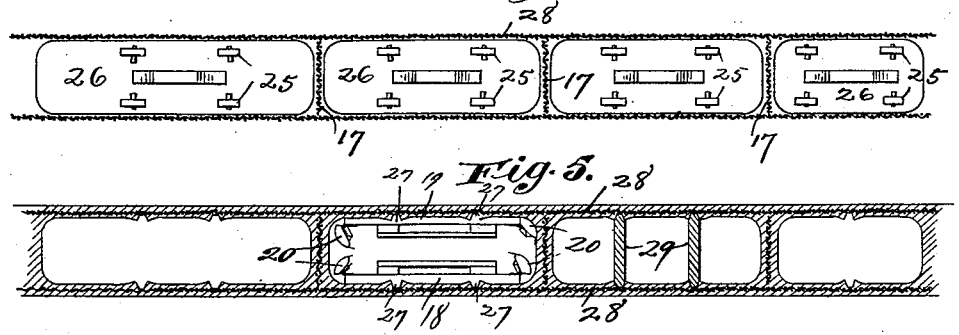
Fig. 4.
Fig. 5.
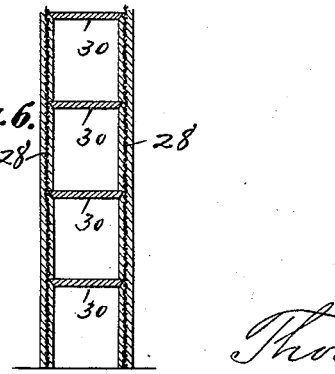
Fig. 6.
Witnesses.
Inventor,
Thomas Jones (No Model.) 6 Sheets—Sheet 4.

T. JONES.
BUILDING CONSTRUCTION.

No. 563,278. Patented July 7, 1896.

Witnesses,
D. Mann
Frederick F. Goodrum

Inventor,
Thomas Jones
By Offield Towle Linthicum
Attys.

(No Model.)  
T. JONES.  
BUILDING CONSTRUCTION.  
6 Sheets—Sheet 5.
No. 563,278. Patented July 7, 1896.
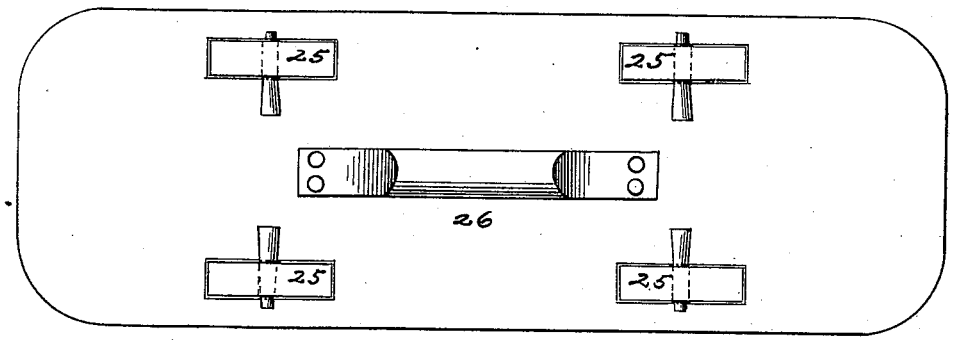
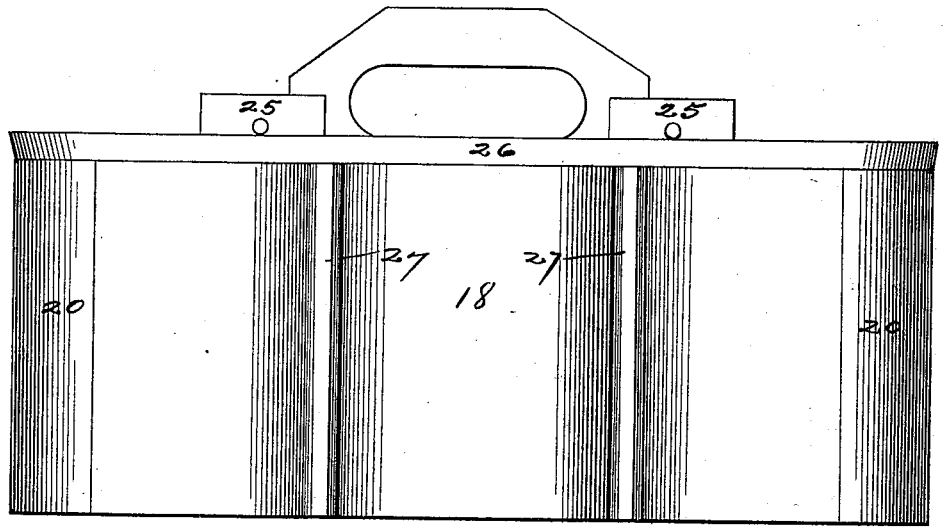

(No Model.) 6 Sheets—Sheet 6.

T. JONES.
BUILDING CONSTRUCTION.

No. 563,278. Patented July 7, 1896.

Witnesses,
Frederick F. Goodwin

Inventor,
Thomas Jones
By Offield, Towle & Linthicum
Attys.

UNITED STATES PATENT OFFICE.

THOMAS JONES, OF CHICAGO, ILLINOIS.

BUILDING CONSTRUCTION.

SPECIFICATION forming part of Letters Patent No. 563,278, dated July 7, 1896.

Application filed July 22, 1895. Serial No. 556,712. (No model.)

*To all whom it may concern:*

Be it known that I, THOMAS JONES, a citizen of the United States, residing at Chicago, Illinois, have invented certain new and useful Improvements in Building Construction, of which the following is a specification.

My invention consists generally in the formation of walls, ceilings, roofs, and floors of cement or concrete molded or cast on continuous metallic webs, such as wire-netting, in such manner as to provide cells and afford protection against fire and promote an even temperature in buildings. By this means the use of timber in structural work may be altogether dispensed with, and the disasters so frequently attending the use of combustible materials thereby avoided. Among the advantages accruing from its use may be named the absence of cracks or any other disfigurement due to the shrinkage or warping of timber or settling, the construction being homogeneous throughout and consisting, practically, of a monolith of incombustible materials of low conducting power, which offers the most prolonged and effectual resistance to fire and render its extension practically impossible. These results are obtained partly by the form of construction and partly by the character of the materials employed.
I adopt the cellular form of construction to secure the utmost strength and lightness with the greatest economy of labor and materials, and also to prevent the transmission of heat either laterally or vertically, and thereby arrest the progress of fire and confine its effects to the apartment in which it originates, and also by the same means promote an even temperature throughout the structure without the attendant dampness of brick walls.
For inside work, on account of its strength and tenacity, as well as for its lightness and low conducting power, I prefer to use a strong gypseous cement, such as is described in my Letters Patents Nos. 415,560 and 518,784.
This cement material may be either used pure, or made into concrete by a due admixture of sand or other inert material to form the body of the work. For outside work I cover the gypseous cement or concrete with a coating of Portland or other silicious cement of suitable thickness to protect it from disintegration by the weather, or in damp situations I form the work entirely of Portland cement, mortar, or concrete. I select wire-netting as the best form of metallic material on which to mold the cement or concrete, because it affords the greatest strength with lightness, and because this attenuated form of the metal admits of its being entirely incased by and embedded in the cement or concrete, which protects it from fire, and thereby prevents its expansion or exposure to heat and the consequent disintegration of the work, which occurs when metal sheathing or lathing is used for similar purposes. By the means I adopt the wire is protected by the concrete and the concrete is strengthened by the wire.

Where extended spaces are to be filled by cellular concrete a skeleton framework of iron or steel with metal furring attached is erected, to which the webs of wire-netting are fastened and the concrete molded thereon.

In forming the material into cells I employ what I term a "collapsible" core or mold, which also forms a part of my invention. This core is so constructed as to form the inside vertical faces of the cell when the concrete is applied and pressed around it, and when the material has set is easily detached and removed without injury to or displacement of the molded concrete.

Figure 7:
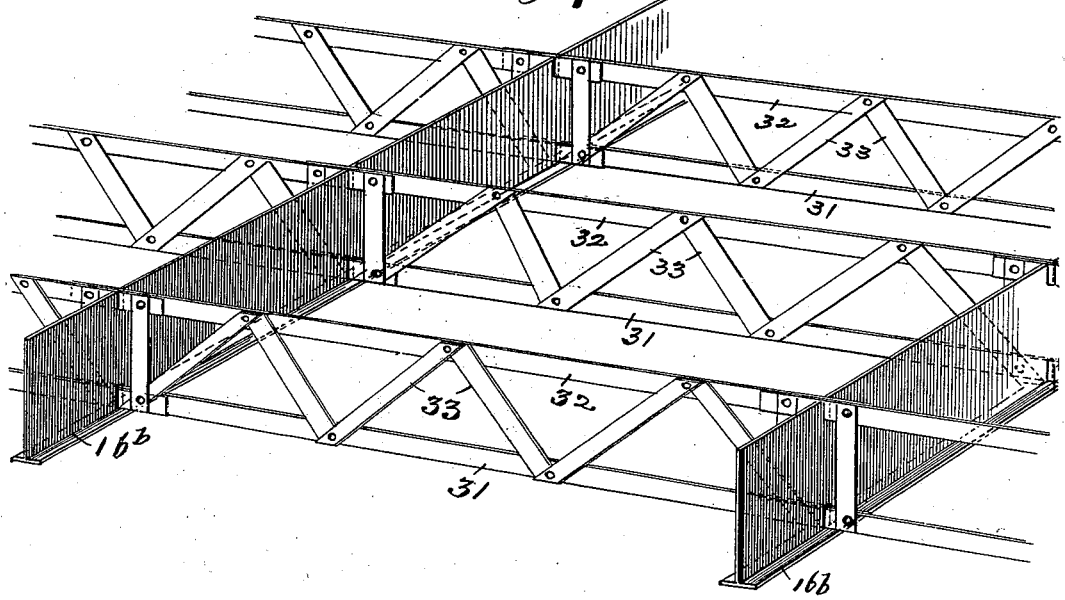
Figure 8:
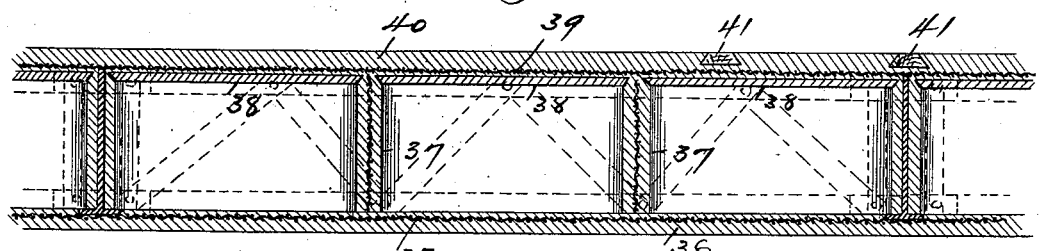
Figure 9:
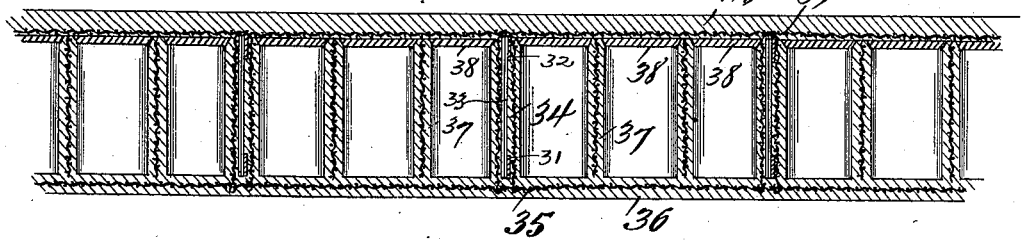
Figure 12:
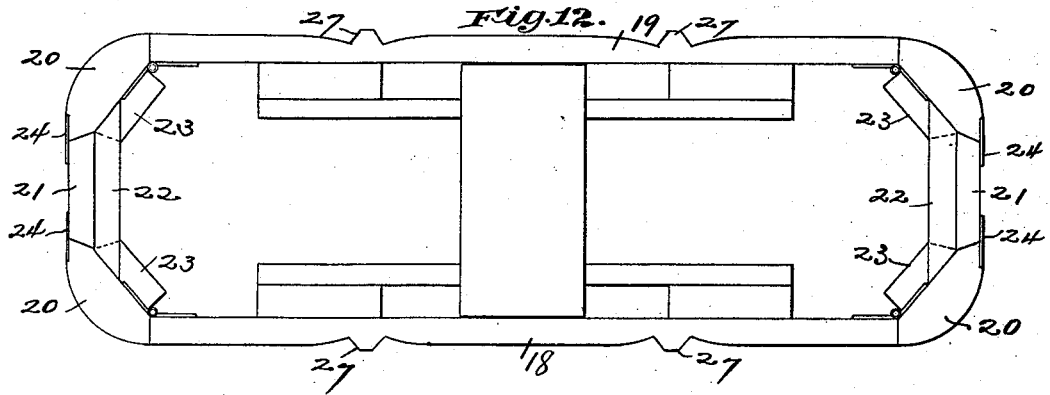
Figure 13:
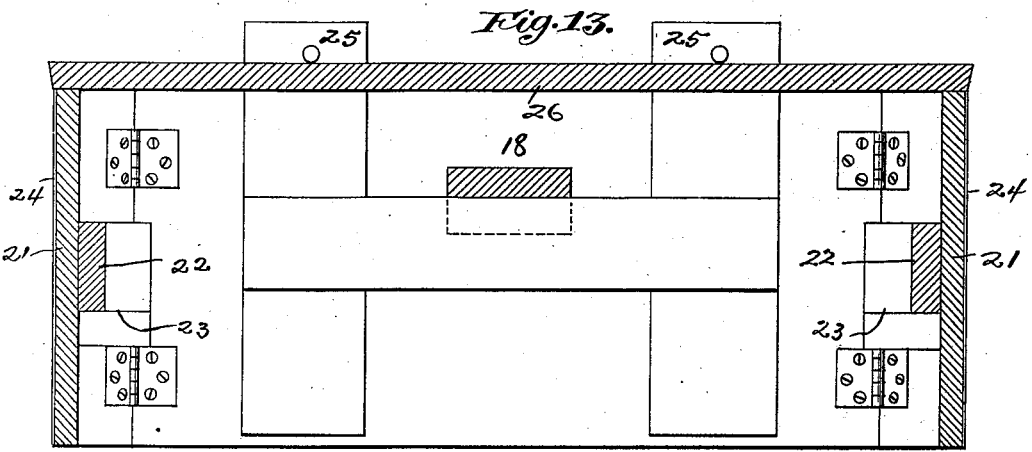
Figure 14:
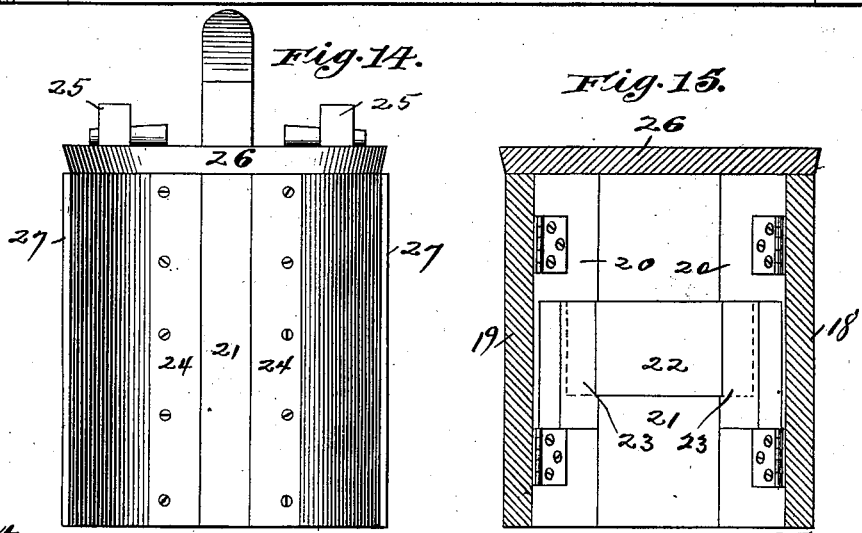
Figure 15:
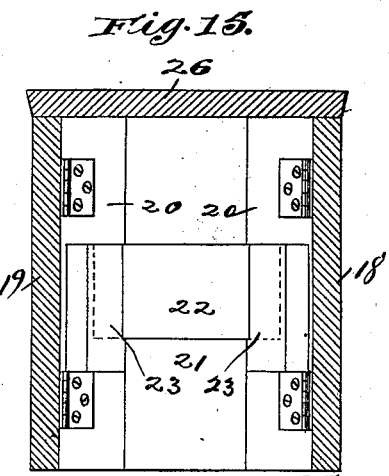

In the accompanying drawings, Figure 1 is a sectional perspective view showing a building the several walls, floors, ceilings, and roof of which are of my improved construction. Fig. 1ᵃ is a broken perspective elevation of a partially-completed wall. Figs. 2, 3, 4, 5, and 6 are views showing sections of a wall in various stages of construction, Figs. 2 and 3 being side elevations, Figs. 4 and 5 transverse sectional plans, and Fig. 6 a vertical section. Fig. 7 is a perspective view showing a method of constructing a ceiling and floor; and Figs. 8 and 9 are sectional views of the same with the netting and plastic material applied. Figs. 10 to 15, inclusive, are detail views of a collapsible core which I employ in the building up of my cellular walls.

Referring to the drawings, and particularly to Figs. 1 to 9, inclusive, the manner of constructing a building in accordance with my invention may be understood. In Fig. 1 a broken perspective view of a building is shown, and where the building is several stories high I prefer to erect a steel framework by the employment of columns, such as 16, with transverse girders 16ª, said columns being set upon suitable pediments or masonry supports and the girders and columns connected in any convenient way to define the several stories of the building. The interiors of the several stories may be likewise subdivided by partitions the framework of which may be of columns and the spaces between adjacent columns filled with the cellular construction shown in Figs. 2 to 6, inclusive.

In constructing a wall, either external or partition, I first suspend vertically and at convenient distances apart, say two or three feet, and at right angles to the face-lines of the intended wall, narrow strips of wire-netting 17, slightly stretch these webs, and fasten them above and below. The selvages of these webs I keep in line with the face of the work and said webs insure continuity of vertical support and take the place of the usual wooden studding. These narrow webs of netting are of a width corresponding to the required thickness of the wall, say about five inches wide for a six-inch partition-wall, and ten or fourteen inches wide for a twelve or sixteen inch external wall. In the spaces between these upright webs, and at a distance of three-quarters to an inch therefrom at each end, I set in position a row of collapsible cores, keeping the sides of the latter in line with the upright selvages of the wire-netting. A row of these cores is shown in position in Figs. 2, 3, and 4 of the drawings, and the particular construction of the cores is shown in Figs. 10 to 15, inclusive, of the drawings and will now be described.

The core represented in the drawings consists of two principal sides 18 19, having attached thereto hinged corner-pieces 20, said corner-pieces being preferably rounded and adapted to fold inwardly or toward each other. These corner-pieces are held in position by the end pieces 21, having cleats 22 engaging with the bevel-blocks 23, secured to the corner-pieces. There may be also employed joint-strips 24 to form guides to direct the end pieces into their seats. The sides have attached thereto upwardly-projecting posts 25, which are adapted to pass through openings in the cover 26, and this cover preferably projects beyond the sides. The cover thus secures and holds the sides and ends in parallel position, and the projecting edges of the cover are preferably beveled to form a rabbet in the cast to receive a slab which is afterwards formed of plastic material and covers the cell, and this rabbet also enables the lid to be withdrawn without disturbing the cast. The sides are also provided with vertical tongues or ribs 27, which form grooves in the concrete for the reception of vertical slabs for dividing the cell transversely, and these ribs also distend the wire-netting which is stretched parallel to the face of the core and hold it at a suitable distance from the face of the core, thereby insuring its perfect incasement in the concrete. After these cores are put in position, as above described, I next stretch parallel to the faces of the line of cores a web of netting 28, keeping the upper selvage in the netting level with the top of the cores. I then interlace at each point of contact these longitudinal webs with the vertical webs, thus forming rectangular spaces in which the cores are inclosed by the netting. To this skeleton structure I then apply the cement or concrete, laying it on the longitudinal webs and the plastic material passing through the mesh thereof against the faces of the cores, thus completely inclosing the mesh in the plastic material. The work is finished to a straight line flush with the top of the cores and the interstices between the ends of the latter are also filled with the plastic material, thus inclosing the vertical webs. By this means a perfect cast is formed. When the concrete has sufficiently set, the core may be removed by raising the lid or cover, withdrawing the end pieces and turning back the corners on their hinges, when the two sides may be withdrawn laterally without disturbing the molded form. Next, I prefer to place slabs 29 of concrete so that their edges shall fit into the rabbets formed by the projecting tongues 27. These slabs stiffen and strengthen the work and divide the space left by the removal of the core transversely into shorter spaces. Similar slabs 30 of required size and shape are next laid horizontally over the top of the spaces left vacant by the removal of the cores and a layer of cement or concrete spread over the entire length of the several cells and finished level with the upper edge of the netting.

The division of the core-spaces vertically by means of the slabs, so as to form cavities of small size, is desired because these small cavities cut off communication laterally, while the slabs laid horizontally forming the top walls of the cells, intercept and prevent transmission of heat vertically and complete the cellular form of construction for one course or tier of work. The work is proceeded with in a similar manner by the formation of succeeding courses until the wall is completed. In finishing the top course next to a ceiling the longitudinal web of netting may be interlaced at its top and bottom, and the last course formed without the employment of the core, or sections may be separately formed and set in cement.

In constructing floors and ceilings of cellular concrete I may provide a light latticed iron framework, as shown in Fig. 7, and apply the webs of netting and the concrete thereto, as shown in Figs. 8 and 9. For example, between the girders 17 I place the latticed transverse girders consisting of the horizontal members 31 32, connected by the lattice-work 33. The girders 16ᵇ are narrow T-beams with the head turned downwardly to form vertical supports for the transverse girders, and the upper members of the latter may be notched into the webs of the girders 16ᵇ. Over these transverse girders I may double a web of wire-netting, allowing its edges or selvages to depend below the plane of the bottoms of the girders. In Fig. 9 this doubled web of netting is shown marked 34. Its selvages, which depend below the girders, are brought to the same plane and there united by interweaving with it longitudinal strips of netting 35. The ceiling may be formed of cement or gypsum, forming a solid body, as at 36, inclosing and completely covering the longitudinal webs 35. The ceiling is thus suspended by means of the doubled webs passing over the tops of the girders. The plastic material may be applied to form the ceiling 36 either from above or below. When completed, the cores may be set up in suitable positions and a network of cells formed to support the floors. A series of these cells are indicated at 37, Fig. 9, and they may have the longitudinal covering-slabs 38. When completed, a web of wire 39 is stretched over the tops of the cells and then a floor is formed by concreting, as at 40. If desired, wooden strips or floor-furring 41 may be embedded in the surface of the concrete mass 40 to receive a wooden floor. By slight modification in the structural features roofs may be constructed in practically the same manner, and in Fig. 1 I have shown the cellular construction as carried out through the walls, both internal and external, the ceilings, and the roof, thus making all portions of the building fireproof and the cellular construction being particularly effective in moderating the temperature and securing an even temperature in the several compartments of the building.

It will be observed that wherever metallic beams are employed they are completely incased in the plastic material, and it will also be observed that the wire-netting is completely enveloped in the plastic material, thus thoroughly protecting it from corrosion. It is obvious that this general plan of construction admits of various modifications as to the strength of the wire, the thickness of the concrete, and the size and form of the cavities, by which its adaptability to the erection of buildings of most durable and costly character, as well as those in which the utmost economy of material and labor are desired, is at once evident.

It is further obvious that the particular construction of the cores described may be very greatly modified. I have described a collapsible core which is well adapted for use because it may be easily handled and readily and quickly removed without injury to the walls, but my invention in its broader scope embodies a collapsible core when used in conjunction with a foraminous support and a plastic wall material without reference to the particular construction of such collapsible or removable core.

From the foregoing description it will be seen that my invention provides a practically incombustible construction; that I have obtained lightness by the formation of the cells and strength by the employment of the continuous strips or webs of metallic meshwork.

I call particular attention to the continuity of these webs of meshwork, which distinguishes my invention from previous cellular constructions composed of series of separately-formed sections lacking the feature of continuous support, whereby the wall is practically homogeneous from top to bottom and from end to end.

Without limiting myself to the precise details of construction, I claim—

1. The herein-described improvement in the construction of the walls of buildings, comprising in combination strips of metallic meshwork stretched vertically from ceiling to floor and edgewise to the face-lines of the wall, other webs of metallic meshwork stretched longitudinally of the face-line of the wall parallel to each other and on opposite sides of the vertical webs and plastic material applied to and enveloping the metallic meshwork and whereby is formed *in situ* a hollow wall having continuous, vertical and longitudinal supports, substantially as described.

2. The herein-described improvement in building constructions, consisting of a wall having a series of transversely-arranged webs of metallic meshwork and a series of longitudinally-arranged webs, plastic material applied to and enveloping the meshwork and slabs of concrete or plastic material dividing the spaces to form cells, substantially as described.

3. The herein-described improvement in the construction of floors, walls and ceilings, comprising in combination strips or webs of metallic meshwork stretched across intervening spaces in the framework of the building in three series, one of said series having its members arranged at right angles to the faces of the wall and the other two series having their members arranged in line with said faces and plastic material applied to the metallic meshwork and enveloping the same, substantially as described.

4. The herein-described improvement in the construction of the walls of buildings, which comprises in combination strips or webs of metallic meshwork extending from the floor to the ceiling and forming continuous supports and other webs of metallic meshwork arranged longitudinally to the wall and parallel to the faces thereof on opposite sides of the vertical webs and connected to the edges thereof, and forming continuous longitudinal supports and plastic material applied to and enveloping the metallic meshwork, substantially as described.

5. The herein-described improvement in the construction of buildings, comprising in combination a series of webs of metallic meshwork arranged transversely to the face-lines of the wall, and a series of longitudinally-arranged webs extending parallel to the faceline of the wall, plastic material applied to and enveloping the meshwork whereby to provide a hollow wall and slabs of incombustible material subdividing the hollow interior into cells, substantially as described.

6. The herein-described improvement in the construction of walls, comprising in combination strips of metallic meshwork secured at their extremities and extending from one boundary of the wall to the other and arranged in three series, one series having its members arranged transversely to the wall and two other series having their members arranged parallel to the face-lines of the wall and connected to the edges of the transverse series and a collapsible core or removable backing against which the plastic material is applied, substantially as described.

7. In the construction of ceilings and floors, the combination with a structural iron framework of a mesh fabric doubled over the girders of said framework and having its edges depending below the plane thereof, a continuous metallic mesh interlaced with and supported by the doubled fabric and a plastic material applied to and enveloping the metallic framework and metallic mesh, substantially as described.

8. A ceiling composed of a structural iron framework, a metallic fabric doubled over the girders of said framework and having its edges depending below the plane thereof, a metallic mesh interlaced with and suspended from said depending edges, a plastic material applied to said fabric and meshwork and a fabric stretched over the top and incased in plastic material whereby to provide a series of cells, substantially as described.

9. A collapsible core for use in the construction of hollow walls, comprising in combination vertical side walls, hinged corners and removable end pieces, substantially as described.

10. A collapsible core for use in the construction of hollow walls having side walls, hinged corners, removable end pieces and lateral braces, substantially as described.

11. A collapsible core for use in the construction of hollow walls, having vertical side walls and external vertical tongues or ribs, substantially as described.

12. A collapsible core comprising in combination a body portion and a removable cover having its edges projecting beyond the plane of the side walls, whereby to form a rabbet when a plastic material is molded around said core, substantially as described.

THOMAS JONES.

Witnesses:
FREDERICK C. GOODWIN,
G. I. HARBRIDGE.